US012791909B2

(12) United States Patent
Tzankov et al.

(10) Patent No.: US 12,791,909 B2
(45) Date of Patent: Nov. 10, 2026

(54) DEEP ULTRAVIOLET LASER SOURCE

(71) Applicant: IPG PHOTONICS CORPORATION, Marlborough, MA (US)

(72) Inventors: Pancho Tzankov, Cupertino, CA (US); Alex Yusim, Boston, MA (US)

(73) Assignee: IPG PHOTONICS CORPORATION, Marlborough, MA (US)

( * ) Notice: Subject to any disclaimer, the term of this patent is extended or adjusted under 35 U.S.C. 154(b) by 464 days.

(21) Appl. No.: 18/259,343

(22) PCT Filed: Dec. 28, 2021

(86) PCT No.: PCT/US2021/065341
§ 371 (c)(1),
(2) Date: Jun. 26, 2023

(87) PCT Pub. No.: WO2022/147006
PCT Pub. Date: Jul. 7, 2022

(65) Prior Publication Data

US 2025/0347973 A1 Nov. 13, 2025

Related U.S. Application Data

(60) Provisional application No. 63/131,877, filed on Dec. 30, 2020.

(51) Int. Cl.
*G02F 1/35* (2006.01)
*G02F 1/355* (2006.01)
(Continued)

(52) U.S. Cl.
CPC ............ *G02F 1/354* (2021.01); *G02F 1/3503* (2021.01); *G02F 1/3507* (2021.01);
(Continued)

(58) Field of Classification Search
CPC ...... G02F 1/354; G02F 1/3503; G02F 1/3507; G02F 1/3551; G02F 2203/26;
(Continued)

(56) References Cited

U.S. PATENT DOCUMENTS 5,144,630 A * 9/1992 Lin ........................... G02F 1/37 372/21
5,742,626 A * 4/1998 Mead ........................ G02F 1/37 606/4

(Continued)

FOREIGN PATENT DOCUMENTS

CA 2391806 A1 2/2003
CN 210465939 U * 5/2020
(Continued)

OTHER PUBLICATIONS

Translation JP 2007298934 Moulton 2007-11-15.*
(Continued)

*Primary Examiner* — Jessica S Manno
(74) *Attorney, Agent, or Firm* — Caroline J. Roush, Esq.

(57) ABSTRACT

A method and system for generating deep ultraviolet (DUV) laser light is disclosed, in one embodiment the DUV laser system includes a fiber laser source configured to emit a poised fundamental laser beam in the near-infrared with a pulse duration of less than 400 femtoseconds (fs), a nonlinear crystal assembly comprising first, second, and third nonlinear crystals that is configured to convert the fundamental laser beam to produce a fifth harmonic laser beam having a wavelength in a range from 200 nanometers (nm) to 230 nm, and at least one compensation plate disposed in at least one position preceding at least one of the first, second, and third nonlinear crystals and configured such that a pair of pulsed laser beams transmitted through the at least one compensation plate are spatially and temporally over-
(Continued)

lapped within the at least one of the first, second, and third nonlinear crystals.

19 Claims, 12 Drawing Sheets

(51) Int. Cl.
*H01S 3/04* (2006.01)
*H01S 3/067* (2006.01)

(52) U.S. Cl.
CPC .......... *G02F 1/3551* (2013.01); *H01S 3/0401* (2013.01); *G02F 2203/26* (2013.01); *H01S 3/067* (2013.01)

(58) Field of Classification Search
CPC ........ G02F 1/3532; G02F 1/3534; G02F 1/37; G02F 1/353; H01S 3/0401; H01S 3/067; H01S 3/07; H01S 2301/08; H01S 3/06791; H01S 3/005; H01S 3/0092; H01S 3/06758; H01S 3/08027; H01S 3/0057; A61L 2/10
See application file for complete search history.

(56) References Cited

U.S. PATENT DOCUMENTS

| | | | |
|---|---|---|---|
| 6,240,111 B1 | 5/2001 | Kubota et al. | |
| 6,249,371 B1 | 6/2001 | Masuda et al. | |
| 6,468,433 B1 * | 10/2002 | Tribelski | B01J 19/12 205/435 |
| 7,113,325 B1 | 9/2006 | Moulton et al. | |
| 9,147,989 B2 | 9/2015 | Shah et al. | |
| 2003/0043452 A1 | 3/2003 | Heist | |
| 2004/0240491 A1 | 12/2004 | Nebel et al. | |
| 2009/0107962 A1 * | 4/2009 | Munroe | B23K 26/0624 372/6 |
| 2010/0136646 A1 | 6/2010 | Tsen et al. | |
| 2011/0134944 A1 | 6/2011 | Kaneda et al. | |
| 2011/0222565 A1 * | 9/2011 | Horain | G02B 26/0875 359/329 |
| 2019/0329357 A1 * | 10/2019 | Avdokhin | B23K 26/0608 |

FOREIGN PATENT DOCUMENTS

| | | | |
|---|---|---|---|
| EP | 1406117 A1 | 4/2004 | |
| JP | 2007110089 A | 4/2007 | |
| JP | 2007298934 A * | 11/2007 | G02F 1/3544 |
| WO | 2014153328 A1 | 9/2014 | |
| WO | 2018036792 A1 | 3/2018 | |

OTHER PUBLICATIONS

Translation CN 210465939 Zhou 2020-05-05.*

Benjamin Willenberg, Fabian Brunner, Christopher R. Phillips, and Ursula Keller, "High-power picosecond deep-UV source via group velocity matched frequency conversion," Optica 7, 485-491 (2020).

S. Chaitanya Kumar, J. Canals Casals, Junxiong Wei, and M. Ebrahim-Zadeh, "High-power, high-repetition-rate performance characteristics of B-BaB204 for single-pass picosecond ultraviolet generation at 266 nm," Opt. Express 23, 28091-28103 (2015).

Tsen SW, Wu TC, Kiang JG, Tsen KT. Prospects for a novel ultrashort pulsed laser technology for pathogen inactivation. J Biomed Sci. Jul. 6, 2012;19(1):62. doi: 10.1186/1423-0127-19-62. PMID: 22768792; PMCID: PMC3495397.

Enqvist, H. (2004). A setup for efficient frequency tripling of high-power femtosecond laser pulses (Master's thesis, Lund Reports on Atomic Physics, LRAP-330).

Dahv A. V. Kliner, Fabio Di Teodoro, Jeffrey P. Koplow, Sean W. Moore, and Arlee V. Smith "Efficient visible and UV generation by frequency conversion of a mode-filtered fiber amplifier", Proc. SPIE 4974, Advances in Fiber Lasers, (Jul. 3, 2003).

Yuxi Chu, Xudong Zhang, Binbin Chen, Jiazan Wang, Junhong Yang, Rui Jiang, Minglie Hu, Picosecond high-power 213-nm deep-ultraviolet laser generation using β-BaB204 crystal, Optics & Laser Technology, vol. 134,2021, 106657.

* cited by examiner

Time Delays Incurred in the NLO crystals

| LBO | Process | θ° | φ° | T °C | GVM (fs/mm) | $d_{eff}$ (pm/V) | Thickness d (mm) for 1ps time delay |
|---|---|---|---|---|---|---|---|
| SHG Type-I | 1030+1030->515 | 90 | 0 | 190 | -50 | 0.85 | 20 |
| SHG Type-II | 1030+1030->515 | 26 | 90 | 35 | -107 | 0.61 | 9.4 |
| THG Type-I | 1030+515->343.3 | 90 | 40.1 | 35 | -307 | 0.69 | 3.3 |
| THG Type-II | 1030+515->343.3 | 50.9 | 90 | 35 | -270 | 0.46 | 3.7 |

FIG. 9

Time Delay Compensation in LBO cut along Z axis

| NLO | Birefringence | θ° | φ° | T°C | GVM (fs/mm) | TDC Dynamic Range | Thickness d (mm) for 1ps time delay |
|---|---|---|---|---|---|---|---|
| TDC0 | 1030-o - 1030-e | 0 | 0 | 35 | 97 | | 10.3 |
| TDC0 | 1030-o - 1030-e | 0 | 0 | 200 | 85 | 14% | 11.8 |
| TDC1 | 515-o - 1030-e | 0 | 0 | 35 | 205 | | 4.9 |
| TDC1 | 515-o - 1030-e | 0 | 0 | 200 | 193 | 6% | 5.2 |
| TDC2 | 343-o - 515-e | 0 | 0 | 35 | 341 | | 2.9 |
| TDC2 | 343-o - 515-e | 0 | 0 | 200 | 328 | 4% | 3.0 |

FIG. 10a

Time Delay Compensation in LBO cut along Y axis

| NLO | Birefringence | θ° | φ° | T°C | GVM (fs/mm) | TDC Dynamic Range | Thickness d (mm) for 1ps time delay |
|---|---|---|---|---|---|---|---|
| TDC0 | 1030-o - 1030-e | 90 | 90 | 35 | 148 | | 6.8 |
| TDC0 | 1030-o - 1030-e | 90 | 90 | 200 | 142 | 4% | 7.0 |
| TDC1 | 515-o - 1030-e | 90 | 90 | 35 | 258 | | 3.9 |
| TDC1 | 515-o - 1030-e | 90 | 90 | 200 | 252 | 2% | 4.0 |
| TDC2 | 343-o - 515-e | 90 | 90 | 35 | 399 | | 2.5 |
| TDC2 | 343-o - 515-e | 90 | 90 | 200 | 393 | 2% | 2.5 |

FIG. 10b

DEEP ULTRAVIOLET LASER SOURCE

RELATED APPLICATIONS

This application is a 35 USC 371 national stage entry of PCT/US2021/065341, filed on Dec. 28, 2021, which claims the benefit of priority under 35 U.S.C. § 119(e) to U.S. Provisional Application Ser. No. 63/131,877, titled DEEP ULTRAVIOLET LASER SOURCE, filed on Dec. 30, 2020, all of which are hereby incorporated by reference in their entirety.

BACKGROUND

Technical Field

The technical field relates generally to laser systems and more specifically to laser systems capable of generating laser light in the deep ultraviolet (DUV) wavelength range based on an ultrafast fiber laser for disinfection and sterilization applications.

BACKGROUND DISCUSSION

Disinfection and sterilization is necessary for limiting the communal spread of viruses and infections among humans. There is a special need when the viruses or infections are deadly and there is no vaccination or treatment. Many of these viruses are spread from person-to-person by aerosols or surfaces containing the viral or microbial pathogens. Even though chemical disinfectants are a good method for killing off pathogens, there is a need for containing the spread of viruses using continuous non-chemical disinfection instead of discreet disinfection.

Ultraviolet (UV) light is very effective at killing microorganisms. Unfortunately, various wavelengths or bands of wavelengths of ultraviolet light can have detrimental effects on regular cells in the human body. These detrimental effects can include cell damage and DNA mutations, which has the potential to lead to cancer or other deadly diseases. Recently, one band of ultraviolet light within the ultraviolet-C (UVC) band and having a wavelength range of 200-230 nanometers (nm) was determined to be safe for humans due to the very small penetration length of <1 micron (μm). Microbial and viral pathogens can still be effectively destroyed by this light, but human cells are not.

UV lamps and UV light emitting diodes (UV-LEDs) in the range of 200-230 nm are currently being developed for killing pathogens. These incoherent light sources have some drawbacks. For one thing, the power density is significantly smaller with distance from the source, which requires the source to be closer to the area of disinfection. This limits the applications where these sources may be used as well as their effectiveness. In addition, these sources have a very short lifetime, which results in continuous replacement of the UV lamp or LED. This is not only inconvenient, but also creates a safety concern if a lamp or LED has degraded and is not as effective.

UV laser sources have high power density and the light is directional. The laser source can be scanned at high speed to supply the appropriate power density to destroy the pathogens. Due to its intrinsic good beam quality and low beam divergence, the laser light can propagate efficiently through large distances to affect pathogens at surfaces and volumes that are tens or hundreds of meters away from the laser source. In addition, when proper laser design is implemented, laser sources have become more rugged with associated longer life expectancies. DUV laser sources unfortunately have not attained as long of an operational life as lasers at other wavelengths. In addition, extraordinary precautions have to be taken into consideration, including the materials used near the laser light for purposes of avoiding damage to components. There are many materials that have absorption in the UV wavelength range and outgassing of one or more of those materials can cover optics that can then lead to catastrophic damage of the laser component. One method for circumventing this issue is to limit the types of materials used and to isolate the laser crystal optics in order to avoid damage. This is extremely difficult to bring about, even with preventative measures such as implementing continuous purging with gases such as dry air, nitrogen, argon, or helium.

SUMMARY

Aspects and embodiments are directed to a method and system for generating DUV laser light.

According to one embodiment, a deep ultraviolet (DUV) laser system, comprises a fiber laser source configured to emit a laser beam at a fundamental wavelength in the near-infrared, the fundamental laser beam configured as a plurality of pulses having a pulse duration of less than 400 femtoseconds (fs) a nonlinear crystal assembly comprising first, second, and third nonlinear crystals and configured to convert the fundamental laser beam to produce a fifth harmonic laser beam having a wavelength in a range from 200 nanometers (nm) to 230 nm, and at least one compensation plate disposed in at least one position preceding at least one of the first, second, and third nonlinear crystals and configured such that a pair of pulsed laser beams transmitted through the at least one compensation plate are spatially and temporally overlapped within the at least one of the first, second, and third nonlinear crystals.

In one example, the DUV laser system further comprises at least one oven, each oven configured to adjust a temperature of the at least one compensation plate. In a further example, the temperature of the oven is adjusted to compensate for a temporal delay between the pair of pulsed laser beams. In a further example, the DUV laser system further comprises a controller configured to control the temperature based on an intensity value of the laser beam emitted from the fiber laser source.

In one example, the first nonlinear crystal receives the fundamental laser beam and is configured to convert the fundamental laser beam to emit a second harmonic laser beam and the fundamental laser beam, the second nonlinear crystal receives the fundamental laser beam and the second harmonic laser beam and is configured to perform sum-frequency mixing of the fundamental laser beam and the second harmonic laser beam to produce a third harmonic laser beam and the second harmonic laser beam, and the third nonlinear crystal receives the second harmonic laser beam and the third harmonic laser beam and is configured to perform sum-frequency mixing of the second and third harmonic beams to produce the fifth harmonic laser beam.

In one example, the at least one compensation plate comprises a first compensation plate disposed between the first and second nonlinear crystals and a second compensation plate disposed between the second and third nonlinear crystals.

In one example, the DUV laser system further comprises a half-wave plate positioned between the first compensator plate and the second nonlinear crystal.

In one example, the second nonlinear crystal is a type I crystal of LBO.

In one example, the second nonlinear crystal is a type II crystal of LBO.

In one example, the DUV laser system further comprises a half-wave plate positioned between the second compensator plate and the third nonlinear crystal.

In one example, the first, second, and third nonlinear crystals comprise LBO, LBO, and BBO respectively.

In one example, the at least one compensation plate comprises a first compensation plate disposed in a position preceding the first nonlinear crystal and a second compensation plate disposed between the second and third nonlinear crystals.

In one example, the DUV laser system further comprises a half-wave plate disposed in a position preceding the first compensation plate.

In one example, the second nonlinear crystal is a type I crystal of LBO.

In one example, the DUV laser system further comprises at least one telescopic lens positioned upstream from the first nonlinear crystal, wherein the at least one telescopic lens is configured such that a light beam incident on the at least one telescopic lens enters the at least one telescopic lens as a light beam of a first diameter and exits the at least one telescopic lens as a light beam of a second diameter. In a further example, the at least one telescopic lens includes a pair of telescopic lenses.

In one example, the first nonlinear crystal is configured to receive the fundamental laser beam and convert the fundamental laser beam to emit a second harmonic laser beam and the fundamental laser beam, the second nonlinear crystal is configured to convert the second harmonic laser beam to produce a fourth harmonic laser beam, and the third nonlinear crystal is configured to receive the fundamental laser beam and the fourth harmonic laser beam and perform sum-frequency mixing of the fundamental laser beam and the fourth harmonic laser beam to produce the fifth harmonic laser beam.

In one example, the at least one compensation plate is disposed between the first and second nonlinear crystals.

In one example, the first, second, and third nonlinear crystals comprise LBO, BBO, and BBO respectively.

In one example, the DUV laser system further comprises at least one oven for adjusting a temperature of a nonlinear crystal of the nonlinear crystal assembly. In one example, the temperature of the nonlinear crystal is adjusted such that the nonlinear crystal is at an optimum temperature where nonlinear multi-photon absorption by a crystal material of the at least one nonlinear crystal is minimized. In a further example, the at least one oven is configured to heat to a temperature in a range from 10° C. to 500° C.

In one example, the $5^{th}$ harmonic laser beam has a wavelength of about 206 nm.

In one example, the fundamental laser beam is a broadband laser beam. In a further example, the fundamental laser beam has a bandwidth of at least 2.8 nm.

In one example, the at least one compensation plate is made from LBO.

In one example, the fifth harmonic laser beam has an average output power of at least 1 watt (W).

In one example, the fiber laser source comprises a mode-locked fiber laser and a chirped pulse amplifier comprising a pulse stretcher and a pulse compressor configured for chirped pulse amplification.

According to another embodiment, a method for generating deep ultraviolet (DUV) laser light comprises generating in a fiber laser source a laser beam at a fundamental wavelength in the near-infrared and having a pulse duration of less than 400 femtoseconds (fs), directing the fundamental laser beam through a nonlinear crystal assembly comprising first, second, and third nonlinear crystals and configured to convert the fundamental laser beam into a fifth harmonic laser beam having a wavelength in a range from 200 nanometers (nm) to 230 nm, and disposing at least one compensation plate in at least one position preceding at least one of the first, second, and third nonlinear crystals, the at least one compensation plate configured such that a pair of pulsed laser beams transmitted through the at least one compensation plate are spatially and temporally overlapped within the at least one of the first, second, and third nonlinear crystals.

In one example, the method further comprises positioning the at least one compensation plate in an oven, the oven configured to adjust a temperature of the at least one compensation plate.

In one example, the method further comprises providing the oven.

In one example, the method further comprises controlling the oven such that the temperature of the at least one compensation plate compensates for a temporal delay between the pair of pulsed laser beams.

In one example, the method further comprises disposing a half-wave plate in a position preceding at least one of the first, second, and third crystals of the nonlinear crystal assembly.

In one example, the method further comprises disposing a pair of telescopic lenses in a position preceding the first nonlinear crystal.

In one example, the fifth harmonic laser beam has a wavelength of 206 nm and an average output power of at least 1 watt (W).

In one example, the method further comprises providing the at least one compensation plate.

In one example, the at least one compensation plate is made from LBO.

In one example, the method further comprises providing the nonlinear crystal assembly.

In one example, the method further comprises providing the fiber laser source, wherein the fiber laser source comprises a mode-locked fiber laser and a chirped pulse amplifier comprising a pulse stretcher and a pulse compressor configured for chirped pulse amplification.

In one example, the method further comprises positioning at least one of the first, second, and third nonlinear crystals in an oven configured to adjust a temperature of the at least one nonlinear crystal.

In one example, the method further comprises controlling the oven such that the temperature of the at least one nonlinear crystal is at an optimum temperature where nonlinear multi-photon absorption by a crystal material of the at least one nonlinear crystal is minimized.

In one example, the method further comprises controlling the oven to heat to a temperature in a range from 10° C. to 500° C.

In one example, the method further comprises irradiating at least one of a microbial or viral pathogen with the fifth harmonic laser beam.

According to another embodiment, a deep ultraviolet (DUV) laser system, comprises a fiber laser source configured to emit a laser beam at a fundamental wavelength in the near-infrared, wherein the fundamental laser beam is a broadband laser beam and is configured as a plurality of pulses having a pulse duration of less than 400 femtoseconds (fs), and a nonlinear crystal assembly comprising first, second, and third nonlinear crystals and configured to convert the fundamental laser beam to produce a fifth harmonic laser beam having a wavelength in a range from 200 nanometers (nm) to 230 nm.

In one example, the fundamental laser beam has a bandwidth of at least 2.8 nm.

In one example, the fifth harmonic laser beam has an average output power of at least 1 watt (W).

In one example, the $5^{th}$ harmonic laser beam has a wavelength of about 206 nm.

In one example, the fiber laser source comprises a mode-locked fiber laser and a chirped pulse amplifier comprising a pulse stretcher and a pulse compressor configured for chirped pulse amplification.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 9 is a table showing the parameters and results of an experiment conducted according to various aspects of the invention;

FIG. 10*a* is a table showing the parameters and results of another experiment conducted according to various aspects of the invention;

FIG. 10*b* is a table showing the parameters and results of another pan of the experiment conducted in accordance with the table of FIG. 10*a*.

DETAILED DESCRIPTION

Figure 1:
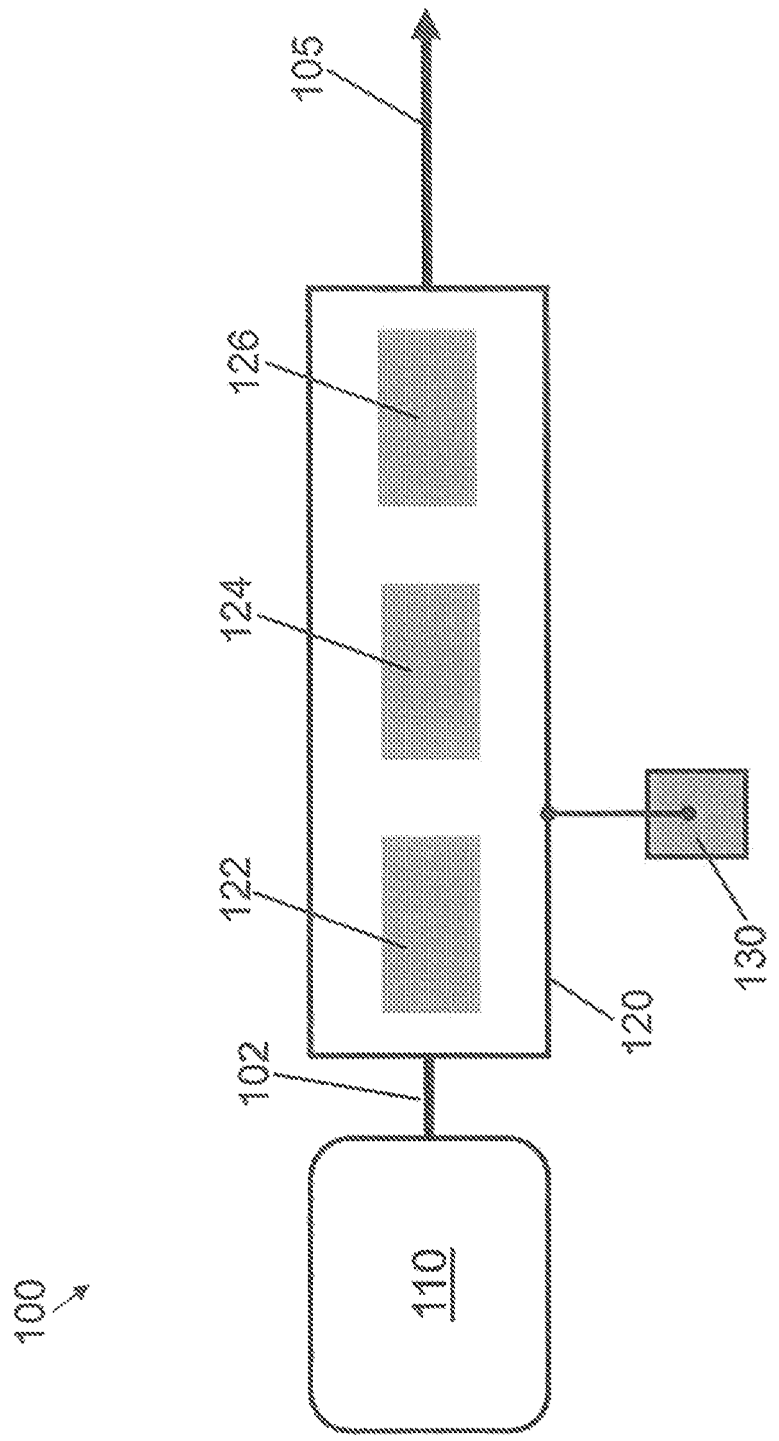
FIG. 1 is a block diagram of one example of a DUV laser system in accordance with aspects of the invention.

One approach to dealing with the limited operational life and material absorption issues raised by DUV laser sources is to implement the use of ultrafast optical pulses. Described herein is a DUV laser system that implements ultrafast optical pulses that mitigate the aforementioned degradation mechanisms and exhibits a long life without the need of an extremely clean environment. As discussed in further detail below, in one example a DUV laser system outputs laser pulses of less than 400 femtoseconds (fs) and has long longevity.

Configurations including ultrafast lasers having a pulse duration of less than 400 fs are limited. Titanium-doped sapphire (Ti:Sapphire) is one option since it has sufficient bandwidth to create pulses much shorter than 400 fs. However, these lasers suffer from various drawbacks that impede their use in disinfection and sterilization applications, such as not being very rugged, being large in size, and incapable of producing high enough average output powers. DUV lasers outputting in a wavelength range of 200-230 nm with picosecond (ps) pulse durations have been demonstrated using disk lasers. However, the bandwidth of such lasers limits the pulse duration to picoseconds, which is not optimum for the self-cleaning effect.

As an alternative, ultrafast fiber lasers based on ytterbium (Yb) doped fiber possess sufficient bandwidth to support pulses shorter than 400 fs. Fiber lasers are very rugged, compact, high-power, efficient lasers, and offer an ideal solution to disinfection and sterilization applications. These lasers can be frequency converted down to 343 nm using non-linear optical (NLO) crystals via third harmonic generation by mixing the fundamental wavelength with the second harmonic wavelength. The systems and methods disclosed herein demonstrate a high average power femtosecond fiber laser at a wavelength of 206 nm with good longevity and efficiency.

Besides disinfection and sterilization, another possible application of the disclosed laser source includes eye surgery. The conventional lasers used for this application include excimer lasers or ultrafast IR lasers that have intrinsic drawbacks of poor beam quality and a high average power requirement. These drawbacks cap the time duration of the procedure due to the limit of heating that the eye can endure. The ultrafast DUV pulses at 206 nm exhibited by the lasers described herein have the ability to perform such surgical operations at much lower average powers, which considerably increases the speed of the eye surgery procedure and can also potentially improve the quality.

Similarly, the disclosed laser can dramatically improve quality and production speeds when used in other applications such as micromachining of highly transparent materials such as smart phone and other display glasses and sapphire. The disclosed laser can also be implemented in wafer inspection applications such as post-lithographic processing where the short wavelength can be beneficial for fast localization of very small defects of a silicon wafer.

As explained in more detail below, a laser system is provided that comprises a fiber laser source that outputs optical pulses in the near infrared (e.g., 1030 nm) having a duration of less than 400 fs (inclusive). According to one embodiment, the fiber laser source outputs pulses having a duration of about 300 fs, and in other embodiments the output pulses have a duration of about 200 fs. The optical pulses are frequency converted to the second harmonic using a first nonlinear crystal, i.e., SHG, such as a lithium triborate (LBO). Fifth harmonic generation to a wavelength of less than 210 nm includes two different methods. The first method involves generating a third harmonic by sum-frequency mixing the second harmonic and the fundamental wavelength radiation in a second nonlinear crystal, i.e., THG. The fifth harmonic is then generated by mixing the second and third harmonic in a third nonlinear crystal. In the second method, the second harmonic is frequency doubled to generate a fourth harmonic in the second nonlinear crystal. The fourth harmonic is then mixed with the fundamental to generate the fifth harmonic in a third nonlinear crystal.

In accordance with some embodiments, one or more of the approaches discussed above may include the use of one or more time delay compensation (TDC) crystals (also referred to herein as a "compensation plate" or "TDC plate") for purposes of improving the spatial and temporal overlap of the optical pulses for the mixed frequencies inside the various frequency conversion NLO crystals. As will be appreciated, achieving optimum overlap (both spatially and temporally) of pulses in the NLO crystals results in higher conversion efficiencies. In addition, without the use of TDC crystals, the time delay between the pulses would have to be corrected with a delay line consisting of beamsplitters and mirrors where the frequencies would have to be spatially split, delayed, and subsequently recombined again, to achieve the same effect. This latter approach has several drawbacks, including increasing the overall size and the number of required optics, and the mirrors and beam splitters introduce large losses. The mirrors and beamsplitters of the conventional delay line systems are also difficult to align and are sensitive. In general, conventional delay line techniques reduce the overall reliability and the pulse-to-pulse energy stability of the system, e.g., by increasing effects from beam pointing instability.

Referring now to the drawings, FIG. 1 is a block diagram showing an embodiment of a DUV laser system, generally indicated 100, that comprises a laser source 110 (also referred to herein as a "pump laser" and a "fiber laser source") configured to emit a laser beam 102 at a fundamental wavelength in the near infrared having a pulse duration of less than 400 fs, a nonlinear crystal assembly 120 comprising first 122 (also referred to herein as the second harmonic generation (SHG) crystal), second 124, and third 126 (also referred to herein as the fifth harmonic generation (FiHG) crystal) nonlinear crystals that is configured to produce a fifth harmonic laser beam 105 (also referred to herein as a DUV laser beam) having a wavelength in a range from 200 nm to 230 nm, and at least one compensation plate 130. As described in more detail below, the at least one compensation plate 130 is disposed in at least one position preceding at least one of the first 122, second 124, and third 126 nonlinear crystals and is configured such that a pair of pulsed laser beams transmitted through the at least one compensation plate are spatially and temporally overlapped within the at least one of the first 122, second 124, and third 126 nonlinear crystals.

Figure 3A:
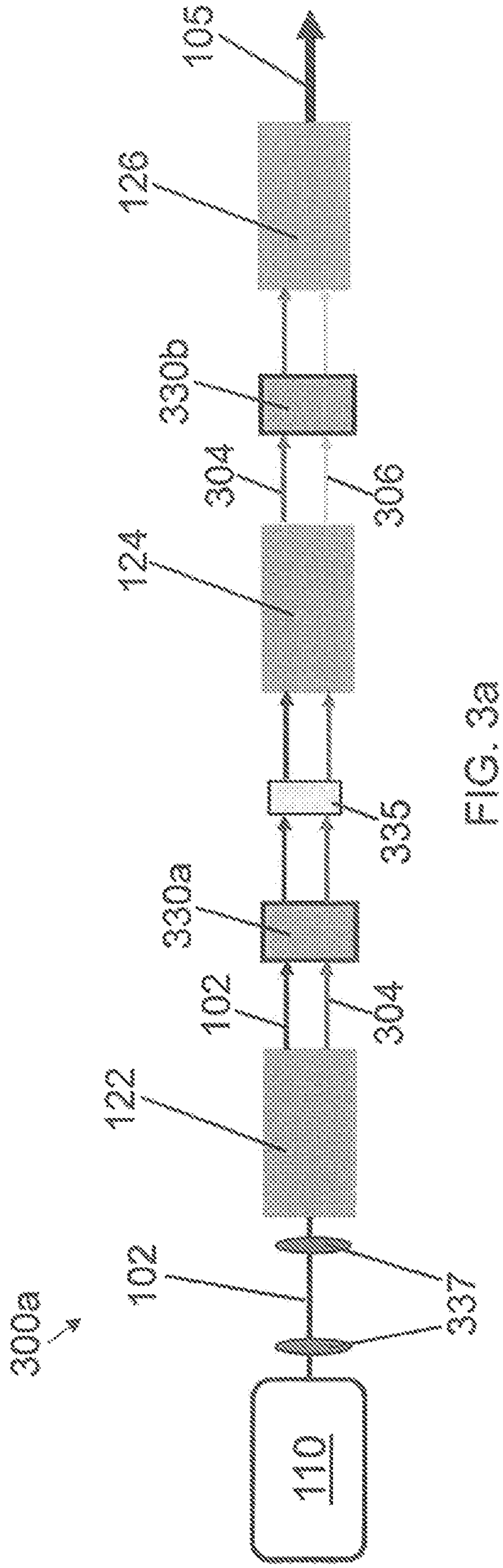
FIG. 3*a* is a block diagram of a first example of a DUV laser system using third harmonic generation in accordance with aspects of the invention.
Figure 3B:
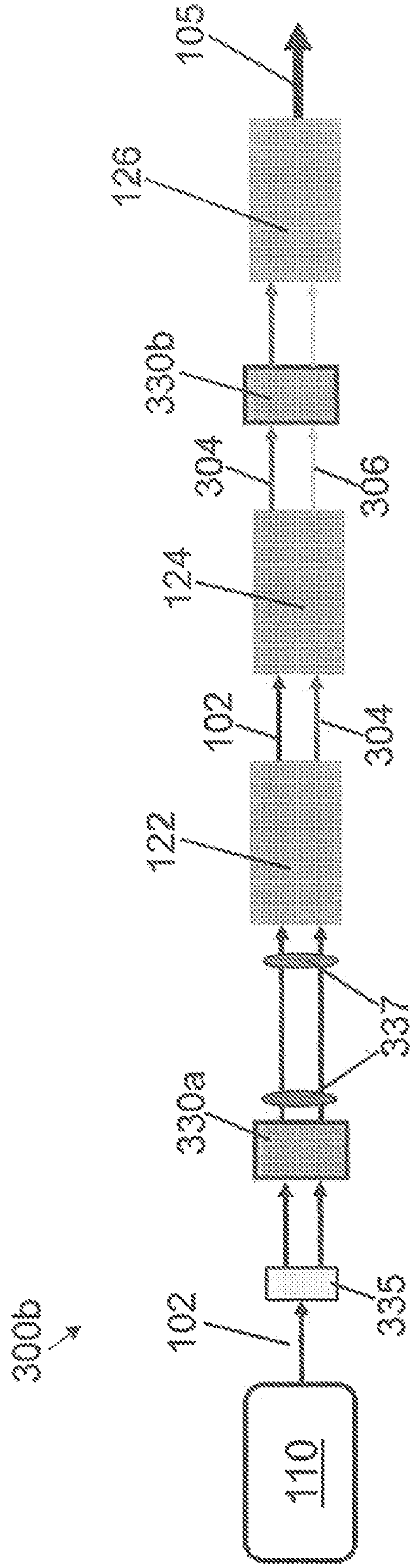
FIG. 3*b* is a block diagram of a second example of a DUV laser system using third harmonic generation in accordance with aspects of the invention.
Figure 3C:
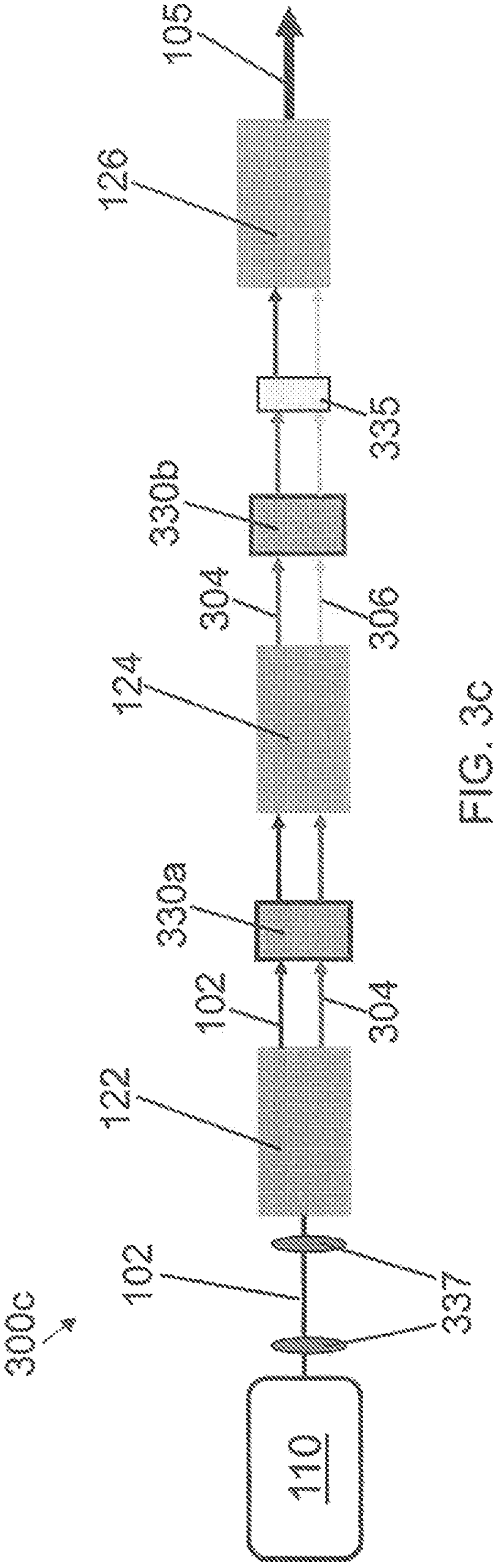
FIG. 3*c* is a block diagram of a third example of a DUV laser system using third harmonic generation in accordance with aspects of the invention.

As mentioned previously, in accordance with at least one embodiment, DUV laser emission is achieved via third harmonic generation. Referring now to FIGS. 3*a*-3*c*, block diagrams of three separate examples are shown of DUV lasers systems 300*a*, 300*b*, and 300*c* that each generate fifth harmonic DUV laser emission using third harmonic generation. In each instance, a first nonlinear crystal 122 receives the fundamental laser beam 102 and converts the fundamental laser beam 102 to emit a second harmonic laser beam 304 and the fundamental laser beam 102, the second nonlinear crystal 124 receives the fundamental laser beam 102 and the second harmonic laser beam 304 and performs stun-frequency mixing of the fundamental laser beam 102 and the second harmonic laser beam 304 to produce a third harmonic laser beam 306 and the second harmonic laser beam 304, and the third nonlinear crystal 126 receives the second harmonic laser beam 304 and the third harmonic laser beam 306 and performs sum-frequency mixing of the second 304 and the third 306 to produce the fifth harmonic laser beam 105.

Referring now to FIG. 3*a*, in accordance with one embodiment the DUV laser system 300*a* has a first 330*a* and a second 330*b* compensation plate. The first compensation plate 330*a* is disposed between the first 122 and second 124 nonlinear crystals, and the second compensation plate 330*b* is disposed between the second 124 and third 126 nonlinear crystals.

As described above, the compensation plate 130 functions to improve the spatial and temporal overlap of the optical pulses for the mixed frequencies inside the various frequency conversion NLO crystals. As will be appreciated, the transformation rate or efficiency of optically non-linear processes is dictated by this spatial and temporal overlap, i.e., optimal interaction, in the NLO. This is a particular problem for ultra-short pulses, e.g., less than 1 ps, where only a part of the pulse of one beam overlaps with a part of the pulse of the other beam in the NLO. Temporal walk-off in nonlinear crystals is caused by the dependency of the refractive index on the wavelength, i.e., dispersion. If two ultra-short pulses of different wavelength or polarization pass through a dispersive medium, the pulses are moved apart temporally. The different group speeds of laser pulses with different wavelength and/or polarization lead to a different temporal delay in comparison with propagation in a vacuum and hence leads to a non-optimum temporal overlap of the pulses in the nonlinear crystal. Spatial walk-off in nonlinear crystals is caused by the birefringent characteristics of the crystal, where walk-off arises from the difference in the direction of energy flow (i.e., the direction of the Poynting vector) to the direction of the wave vector k. At the end of the crystal, both laser beams are separated by a distance known as the spatial walk-off angle. Both spatial and temporal walk-off in effect shorten the interaction length between the laser beams within the NLO, which detrimentally affects the conversion efficiency.

In the example DUV laser system 300*a* shown in FIG. 3*a*, the first nonlinear crystal 122 produces spatial and temporal walk-off between the fundamental laser beam 102 and the second harmonic laser beam 304 exiting the first nonlinear crystal 122, which is compensated for by the first compensation plate 330*a*. The second nonlinear crystal 124 also produces spatial and temporal walk-off between the second harmonic laser beam 304 and the third harmonic laser beam 306 exiting the second nonlinear crystal 124, which is compensated for by the second compensation plate 330*b*.

The compensation plate 130 has different indices of refraction along different axes. For instance, for biaxial crystals the index of refraction is different for each of the three axes, and for uniaxial crystals, the index of refraction is different along two axes only. The compensation plate 130 compensates for the temporal mismatch within the NLO by effectively implementing different group velocities of propagation for the two pulsed laser beams of interest. Spatial mismatch is addressed by displacing one of the beams away from the beam propagation axis via spatial walk-off. In effect, the compensation plate 130 is configured (e.g., cut and oriented and of a particular length/thickness) such that the extraordinary beam walks off at an angle opposite to that of the nonlinear crystal (122, 124, or 126) positioned downstream from the compensation plate 130. The crystal is configured such that the ordinary wave is not displaced and the extraordinary wave is displaced. The amount of displacement depends on the length of the crystal.

In accordance with at least one embodiment, the compensation plate 130 is made from a birefringent material, non-limiting examples of which include LBO. Experiments performed by the inventors found that the use of a proper type of birefringent material as the TDC crystal is very important for long-term performance. When LBO crystal was used as the TDC material, it was found to suppress long term damage when compared to other materials used. When other materials were used, various optical damages were introduced to the subsequent optical components, which resulted in reduced reliability of the system. Results from the experiments also indicate that using LBO as the TDC material provides the high temporal dynamic range required for the proper operation of the disclosed DUV system and method. In accordance with at least one embodiment, the LBO used as the TDC crystal is cut along its optical z-axis. As discussed in further detail below, LBO cut along its z-axis was found to exhibit the highest temporal dynamic range and lowest absorption and hot spot formation.

Figure 2:
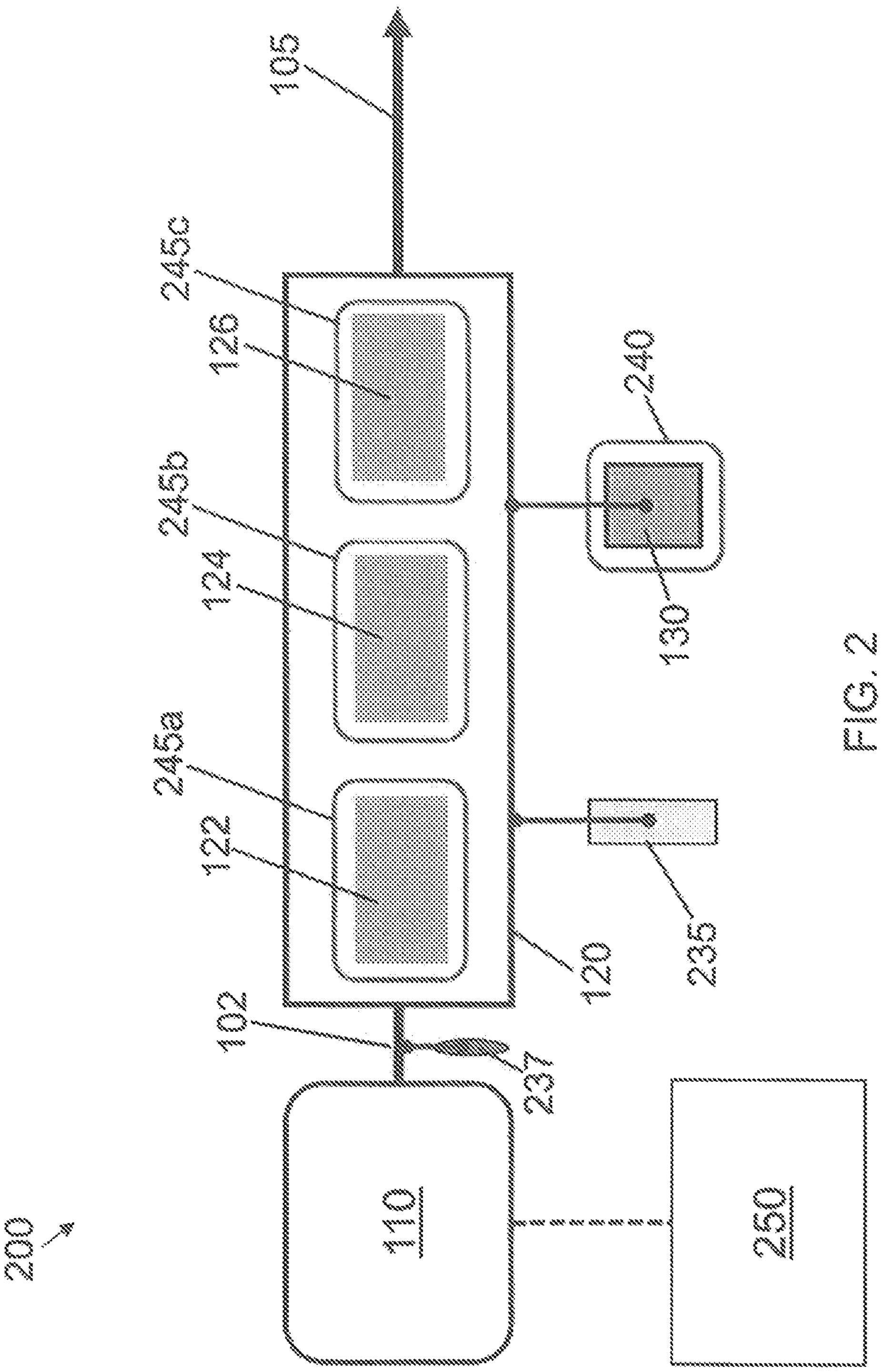
FIG. 2 is a block diagram of another example of a DUV laser system in accordance with aspects of the invention.

A block diagram of another example of a DUV laser system 200 is shown in FIG. 2. DUV laser system 200 is similar to that shown in FIG. 1 in that it also includes the laser source 110, the nonlinear crystal assembly 120 comprising first 122, second 124, and third 126 nonlinear crystals configured to produce a fifth harmonic laser beam 105, and at least one compensation plate 130. In addition, DUV laser system 200 also includes a half-wave plate 235 that is used in combination with the compensation plate 130 in accordance with another aspect of the invention. The laser system 300*a* of FIG. 3*a* implements the use of a half-wave plate 335, which is positioned between the first compensation plate 330*a* and the second nonlinear crystal 124. In this embodiment, the second nonlinear crystal 124 is a type I nonlinear crystal, non-limiting examples of which include LBO. In type I phase matching, the fundamental 102 and the second harmonic 304 are polarized perpendicular to each other. The addition of the half-wave plate 235 ensures that the two laser beams are polarized in the same direction in the nonlinear crystal.

FIG. 3*b* is a block diagram of another example of a DUV laser system 300*b* that generates fifth harmonic DUV laser emission via third harmonic generation. DUV laser system 300*b* includes a first compensation plate 330*a* disposed in a position preceding the first nonlinear crystal 122 and a second compensation plate 330*b* disposed between the second 124 and third 126 nonlinear crystals. The latter of these functions in a similar manner as the second compensation plate 330*b* discussed above in reference to FIG. 3*a*.

DUV laser system 300*b* also includes a half-wave plate 335 disposed in a position preceding the first compensation plate 330*a*. In this configuration, the half-wave plate 335 and the IDC crystal 330*a* are both positioned upstream from the SHG crystal 122 for purposes of introducing two orthogonal polarizations at the fundamental frequency 102 that are properly delayed to each other based on the TDC crystal 330*a* design such that the unconverted fundamental frequency can mix with already frequency converted signal. As an example, the SHG signal 304 (generated from one of the fundamental frequencies in one polarization) is mixed with the fundamental frequency (that has not been frequency converted) in the THG crystal 124. Similar configurations can be applied to other harmonic generation. The benefit of introducing two polarization and engineered time delay is that using the fundamental frequency that has yet to experience frequency conversion provides improvement in frequency conversion efficiency. In addition, this design provides an additional degree of freedom for optimization and greater reliability as the retardation and time delay can be performed at much lower intensities. In accordance with another aspect, the second nonlinear crystal 124 is a type I nonlinear crystal.

According to another example related to generating fifth harmonic DUV laser emission using third harmonic generation, a block diagram of a DUV laser system 300*c* is shown in FIG. 3*c*. In this example, a first compensation plate 330*a* is disposed between the first 122 and second 124 nonlinear crystals and a second compensation plate 330*b* is disposed between the second 124 and third 126 nonlinear crystals. According to one embodiment, the second nonlinear crystal 124 is a type II nonlinear crystal, such as type II LBO. An advantage associated with using type I nonlinear crystals includes higher conversion efficiencies as they exhibit larger nonlinearity and wider spectral acceptance. Type II nonlinear crystals may be used in instances where the beams have to be tightly focused in the nonlinear crystals as they have about three times as large an acceptance angle and about twice less spatial walk-off than type I. However, the nonlinearity $d_{eff}$ is −30% lower than for type I. The functionality of the first compensation plate 330*a* is similar to that described above in reference to FIG. 3*a*. As can be seen in FIG. 3*c*, this example configuration also includes the use of a half-wave plate 335.

According to one embodiment, the first 122, second 124, and third 126 nonlinear crystals of DUV laser systems 300*a*-300*c* of FIGS. 3*a*-3*c*, comprise LBO, LBO, and barium borate (BBO), respectively. However, it is to be appreciated that other nonlinear crystal materials are also within the scope of this disclosure.

Returning now to FIG. 2, in accordance with at least one embodiment, the DUV laser system can further comprise at least one oven 240, where each oven 240 is configured to adjust a temperature of the at least one compensation plate 130. According to this embodiment, the temperature of the TDC crystal 130 is modulated to tune time delay in the birefringent material, i.e., the temperature of the oven is adjusted to compensate for a temporal delay between the pair of pulsed laser beams that are introduced downstream in the nonlinear crystal. The TDC varies with laser conditions such as power and intensity levels. This is due to the nature of the intensity dependence of the group velocity mismatch in the Type I SHG.

Active dynamic compensation by heating the crystal is critical as laser conditions change. For this purpose, a controller 250 is implemented to control one or more operating parameters (e.g., oven temperature) of the oven 240. In accordance with at least one embodiment, the controller 250 is configured to control the temperature of the oven 240 based on an intensity value of the laser beam 102 emitted from the laser source 110. In one embodiment, the oven 240 is heated to a temperature of at least 400° C., and in some instances the oven is heated to about 500° C. According to some embodiments, the oven 240 may be heated to a temperature in a range from 10° C. to 500° C. The inventors have found that such a wide temperature range allows for a greater tunability range of the temporal delay between the short pulses of any pair of pulsed laser beams.

According to one aspect, a calibration routine can be performed to determine a temperature for the oven 240 that houses the TDC plate 130. This can be accomplished by measuring the temporal delay based on temperature (of the compensation plate 130) and intensity/power. For example, for a given power for the laser source 110 and emitted fundamental beam 102, the temperature of the oven 245 can be increased to the point where the temporal and spatial delay is minimized, i.e., the maximum DUV output power is realized. In instances where additional compensation is needed that cannot be achieved via the temperature of the TDC plate 130, the thickness of the TDC plate can be increased (or decreased) by changing it to a thicker or thinner plate to achieve the optimum output power.

In certain embodiments, the DUV laser system 200 can also include at least one telescopic lens 237 positioned upstream from the first nonlinear crystal 122. The telescopic lens 237 functions to adjust a beam size of a beam incident on the telescopic lens 237. For example, a light beam incident on the telescopic lens 237 enters the telescopic lens 237 as a light beam of a first diameter and exits the telescopic lens 237 as a light beam of a second diameter. As can be seen in FIGS. 3*a*-3*c*, in some embodiments the at least one telescopic lens includes a pair of telescopic lenses 337. In one embodiment, the optical beam size is changed using telescopic lenses composed of magnesium fluoride ($MgF_2$) material, which was found by the inventors to optimize output power and conversion efficiency and greatly improve the reliability of the system. The beam size can be increased or decreased to achieve an optimum diameter such that good conversion efficiency is achieved without saturation. Due to the much lower optical nonlinearity in $MgF_2$ compared to other widely used optical materials, the high peak power pulses do not generate hot spots that often damage components positioned downstream from the telescopic lens, e.g., the nonlinear crystals of the nonlinear crystal assembly 120. This design aspect improves the longevity of the disclosed DUV laser.

The one or two telescopic lenses 237 can also have another function. According to another aspect, the lens or lenses are used to form a beam waist with a long enough Rayleigh length such that the beam maintains the same diameter over an extended range. This helps to ensure good beam properties and spatial overlap between each of the two beams with different wavelengths in the THG and FiHG crystals.

Figure 4:
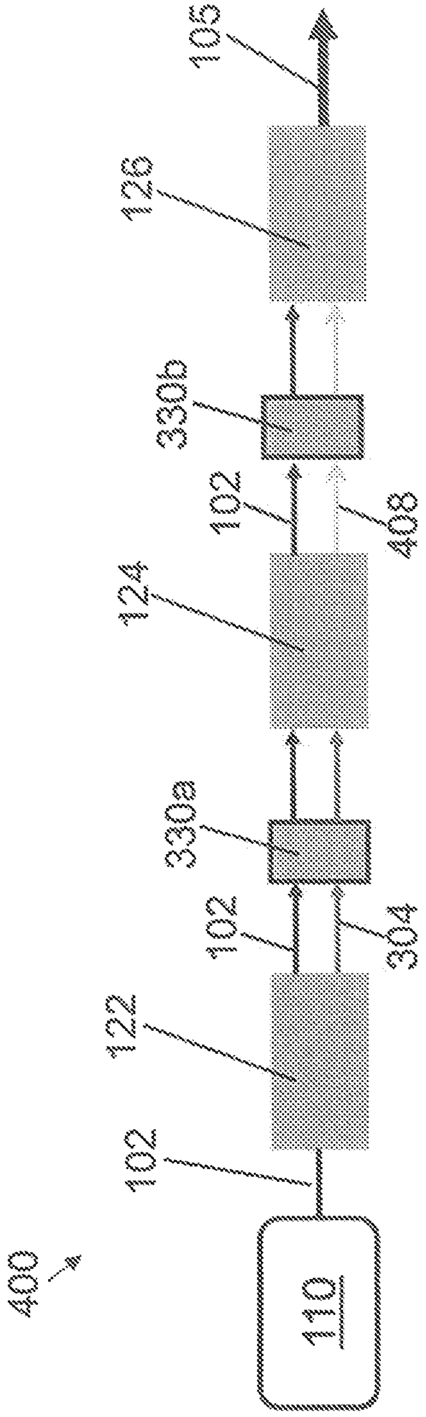
FIG. 4 is a block diagram of one example of a DUV laser system using fourth harmonic generation in accordance with aspects of the invention.

FIG. 4 is a block diagram of one example of a DUV laser system 400 that generates fifth harmonic DUV laser emission via fourth harmonic generation. In particular, fifth harmonic DUV laser emission is achieved via generation of a fourth harmonic in the second nonlinear crystal 124. The first nonlinear crystal 122 receives the fundamental laser beam 102 and converts the fundamental laser beam 102 to emit a second harmonic laser beam 304 and the fundamental laser beam 102 as described above. The second nonlinear crystal 124 converts the second harmonic laser beam 304 to produce a fourth harmonic laser beam 408. The third nonlinear crystal 126 receives the fundamental laser beam 102 and the fourth harmonic laser beam 408 and performs sum-frequency mixing of the fundamental laser beam 102 and the fourth harmonic laser beam 408 to produce the fifth harmonic laser beam 105. A first compensation plate 330*a* is disposed between the first 122 and second 124 nonlinear crystals. In one embodiment, the first, second, and third nonlinear crystals comprise LBO, BBO, and BBO, respectively.

Returning now to FIG. 2, in some embodiments the DUV laser system 200 further includes at least one oven 245 for adjusting a temperature of a nonlinear crystal of the nonlinear crystal assembly 120. For instance, each of the first 122, second 124, and third 126 nonlinear crystals may be housed in a respective oven 245*a*, 245*b*, and 245*c*. As will be appreciated, the nonlinear crystals may be positioned within a temperature controlled oven (e.g., by the controller 250) to allow for thermal tuning, which in turn enhances conversion efficiencies and results in higher average output powers. According to one embodiment, the oven 245 adjusts the temperature of the nonlinear crystal (e.g., 122, 124, and/or 126) to an optimum or target temperature such that nonlinear multi-photon absorption by the material of the nonlinear crystal is minimized or otherwise reduced. For example, a higher temperature of the NLO (e.g., temperatures above 200° C., including 400° C., 450° C., 500° C. that do not detrimentally affect the functionality of the NLO) during operation reduces two-photon absorption. According to one embodiment, oven 245 is configured to be heated to a temperature of at least 200° C. inclusive, and in another embodiment, oven 245 is configured to be heated to a temperature in a range from 10° C. to 500° C. Two-photon absorption will decrease both the conversion efficiency and the longevity of the FiHG crystal 126 and in some instances the THG crystal as well. As will be appreciated, the operating parameters of the oven 245 can be controlled by controller 250. For instance, the controller 250 can increase the temperature of the oven 245—leading to improved conversion efficiency and reliability of the NLO crystals.

The laser source 110 is configured as a fiber laser source. According to at least one embodiment, the wavelength of the fundamental laser beam 102 emitted by laser source 110 is in the near-infrared, e.g., 750-1400 nm, and in some embodiments is emitted in the 1 μm wavelength range. For instance, the wavelength of the fundamental laser beam 102 may be in a range of 1030 to 1080 nm, and in one embodiment, the fundamental wavelength is 1030 nm. According to one embodiment, the fundamental laser beam 102 is a broadband laser beam, and in certain embodiments has a bandwidth of at least 2.8 nm, and in certain other embodiments is as large as 16 nm. The inventors found that using such a broadband source enhanced long-term reliability of the DUV system.

In accordance with at least one embodiment, laser source 110 is configured such that the pulses of the fundamental laser beam 102 have an average power of at least 50 watts, and in some instances have an average power of at least 60 watts. Depending on the application, the laser source 110 can also be configured to output a fundamental laser beam 102 having an average power less than 50 watts, for instance 5-10 watts, 10-20 watts, 20-30 watts, 30-40 watts. In some instances, the peak power of the fundamental laser beam 102 can be on the order of megawatts (MW), one example being 1-1000 megawatts (MW). In other embodiments, the peak power of the fundamental laser beam 102 is on the order of gigawatts (GW).

In accordance with various aspects, the overall conversion efficiency of the nonlinear crystals 122, 124, 126 of the nonlinear crystal assembly 120 can be on the order of about 5%, and in other embodiments is on the order of about 2%. For example, with a 1030 nm and 40 W output from the laser source 110, the average output power from the DUV laser beam 105 may be about 800 milliwatts (mW). For SHG crystal 122, the conversion efficiency can be up to 80%, with some embodiments having a conversion efficiency of about 50%. For the THG crystal 124 of FIGS. 3*a*-3*c*, the conversion efficiency can be up to 40% and in some embodiments is about 35%, and in other embodiments is in a range of 20-35%. In some embodiments, the THG crystal can be configured to have to have a conversion efficiency that allows for the optimum FiHG conversion, which may not be the maximum efficiency value for the THG crystal. For the FiHG the conversion efficiency is about 5%, and in some embodiments is about 2%, and in other embodiments is about 1%.

The wavelength of the DUV laser beam 105 is in a range of 200-230 nm, and in some instances is in a range of 206-216 nm inclusive, and according to at least one embodiment the DUV laser beam 105 is about 206 nm, with shorter wavelengths also being within the scope of this disclosure. In certain embodiments, the fifth harmonic laser beam 105 has an average output power of at least 1 watt (W), at least 2 W, and can be in a range from a few 100s of mW (e.g., at least 100 mW, at least 200 mW) to 5 W. Higher powers are also within the scope of this disclosure. The output power can be tailored or otherwise dictated by the application, since some materials to be disinfected will be able to handle a higher spatial power density (and shorter required exposure times), while others need a lower spatial power density (and longer exposure time).

In one embodiment, the lifetime of the DUV laser source as described herein can be characterized by having a lifetime of at least 1000 hours. Longer lifetimes are also within the scope of this disclosure. It is to be appreciated that the absolute lifetime of the DUV laser system may vary depending on the application as well as on the particular components, e.g., average power output, type of fiber, etc. The term "lifetime" refers to the time during which the output power and/or other properties of the DUV laser system stay at or near a percentage of its nominal value (e.g., the system's rated power).

Figure 11:
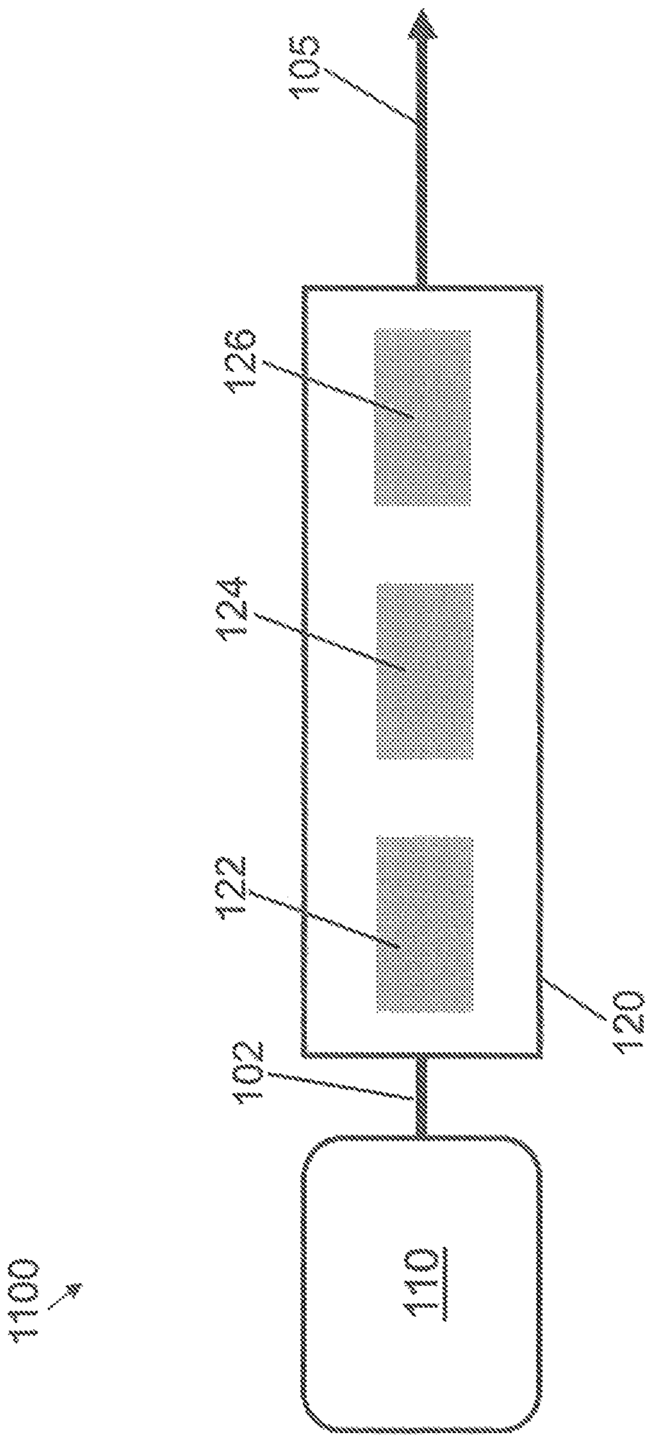
FIG. 11 is a block diagram of yet another example of a DUV laser system in accordance with aspects of the invention.

Although examples of the disclosed DUV laser system described thus far have included at least one compensation plate 130, embodiments where the DUV system does not include the compensation plate 130 are also within the scope of this disclosure, and in fact the inventors found that for certain applications adequate DUV conversion was achieved without the use of the compensation plate. An example of such a system 1100 is shown in FIG. 11, which is nearly identical to DUV system 100 of FIG. 1, but without compensation plate(s) 130. DUV laser system 1100 comprises the laser source 110 and the nonlinear crystal assembly 120 as described above. In addition, system 1100 can include at least one oven 245 for adjusting a temperature of a nonlinear crystal of the nonlinear crystal assembly 120, as previously described in reference to DUV system 200 of FIG. 2. It is to be appreciated that other features described above, e.g., one or more telescopic lenses, a controller, may also be included in system 1100.

Laser Source

In certain embodiments, the laser source 110 comprises a mode-locked fiber laser and a chirped pulse amplifier comprising a pulse stretcher and a pulse compressor configured for chirped pulse amplification (CPA). Such systems are useful for producing laser light having high and ultra-high pulse repetition rates and non-damage inducing peak powers while still having a high average power. Ultrafast pulses (e.g., shorter than 20 ps and as short as a few fs) exhibit increased pulse distortion due to optical nonlinearity that is introduced when optical pulses propagate through optical components/materials. The pulses start to degrade and change in shape and/or form pre-pulses or post pulses that end up increasing the total duration of the temporal envelope. This is an issue since many applications require ultrashort pulse with high peak power and high pulse energy without any temporal pedestal. The temporal pedestal can be created by higher order dispersion introduced through optical components or through intensity dependent optical nonlinearity, which is most often self-phase modulation (SPM).

One popular method to extract more pulse energy and increase the threshold for SPM is through CPA. In this technique, the pulses are stretched in time by adjusting the phase of each longitudinal mode within the spectral envelope in a linear fashion. Bulk gratings, prisms, fiber, chirped fiber Bragg gratings or chirped volume Bragg gratings can be used to stretch the pulses by introducing this dispersion. The pulses can then be amplified through the gain material achieving higher pulse energy before reaching the peak powers that induce SPM. Finally, the pulses are compressed with a matching dispersion element to recompress the pulses back down to picosecond or femtosecond pulse durations achieving the required pulse energy and the ultrashort pulses.

Figure 5:
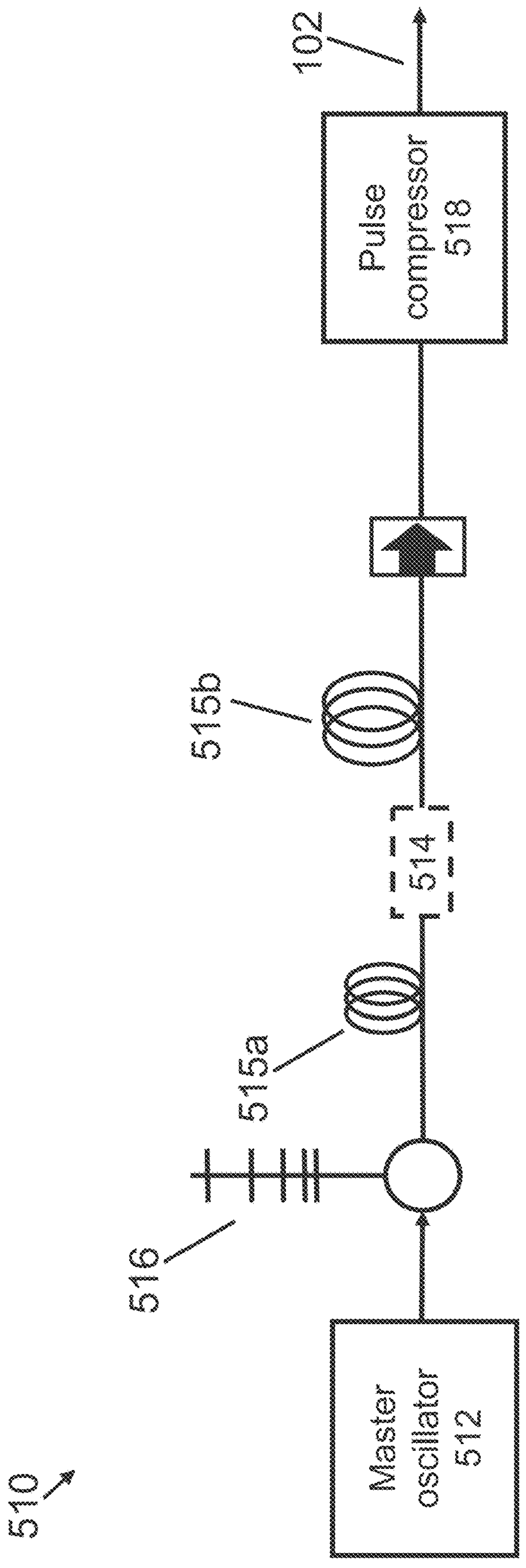
FIG. 5 PRIOR ART
FIG. 5 is a block diagram of one example of a laser source in accordance with at least one aspect of the invention.

One non-limiting example of such a system is shown in FIG. 5, generally indicated 510, which is also described in U.S. patent application Ser. No. 16/496,828, commonly owned by applicant, the content of which is fully incorporated herein by reference, and referred to herein as the '828 application. As shown in FIG. 5, laser source 510 includes a master oscillator 512 (which in some instances can be a mode-locked laser source, one example of which is described below in reference to FIG. 8), and a chirped pulse amplifier that includes a pulse stretcher 516 and a pulse compressor 518. Input laser pulses from the master oscillator 512 are stretched in time using the pulse stretcher 516, amplified in an amplification stage that includes fiber power amplifier 515*b* and optionally preamplifier 515*a*, and compressed using pulse compressor 518.

As will be understood, the temporal stretching and compression of the pulse are based on delaying different wavelengths in the pulse by different amounts of time. In the stretcher 516, the short wavelength pulses may be delayed with respect to the long wavelength pulses or vice versa and, in the compressor 518, this effect is undone again. Bulk gratings, prisms, fiber, fiber Bragg grating (FBG), chirped fiber Bragg gratings (CFBG), or chirped volume Bragg gratings (CVBG) are examples of strongly dispersive elements that function to stretch the pulses. Pulse stretcher 516 is configured to stretch pulse durations to produce stretched pulses having a reduced peak power. In some embodiments, the pulse stretcher 516 is configured as a CFBG, as indicated in FIG. 5.

The chirped amplified pulses are compressed by the pulse compressor 518, which in some embodiments, is configured as a chirped volume Bragg grating (CVBG). In some embodiments, the compressor 518 is configured with transmission gratings capable of handling high average powers. For instance, the transmission gratings may be formed from silica using holographic procedures and etching processes tailored to minimize defects and imperfections.

As explained in the '828 application, conventional CPA systems compensate for the linear portion of the chirp, but higher order dispersion techniques are required to compensate for the nonlinear chirp. For instance, transform-limited sub-nanosecond pulses output by master oscillator 512 each have a spectral bandwidth, and the spectral phase of the stretched pulses deviates from that of transform-limited pulses, and becomes particularly articulated after being compressed by compressor 518. In accordance with various aspects, laser source 510 is configured to suppress the pulse pedestal or pulse distortion caused by ultrafast pulses propagating through optical components or materials by correcting the phase across a chirped optical pulse. To this end, laser source 510 is configured with a tunable pulse stretcher or compressor that is adapted for controllable dispersion compensation to provide near transform-limited sub-nanosecond pulses at the output of the CPA system. This is accomplished by providing a pulse shaper configured as a compact tunable Bragg grating with a number of adjustable segments that manipulate phase of incoming optical pulses. One or both of the pulse stretcher 516 or pulse compressor 518 can be configured with this tunable Bragg grating. The tunable component is realized by configuring the Bragg gratings with selectively tunable segments that are controlled by actuators, that induce spectral phase changes on respective segments so as to adjust the spectral phase to that of a transform-limited pulse. The actuators are in turn controlled by a corrective signal output by the controller. Tuning is performed by adjusting selected segments to predetermined temperatures or voltages that are input or determined during a calibration routine.

In accordance with at least one embodiment, the optical pulses are pre-chirped using the FBG pulse stretcher or pulse shaper in order to improve the temporal overlap and beam intensities in the NLO crystals, which results in improved conversion efficiency and reliability. The temporal pre-chirping is performed such that the pulse duration does not exceed 400 fs for purposes of improving the operating life of the laser.

The preamplifier 515*a* and amplifier 515*b* of the CPA configuration operate in the 1-2 μm range and are pumped by respective pumps (not shown) which can be driven by one or more pump drivers using a controller (such as controller 250 in FIG. 2). The controller includes hardware (e.g., a general purpose computer) and software that may be used in controlling components of the system, including the pumps. The pumps can be implemented by SM or MM laser diodes or fiber laser pumps that operate in the CW mode and can be arranged in a side-pumping or end-pumping configuration. According to some embodiments, laser pulses of SM light are delivered via SM passive fiber to active fiber of amplifier 515*b* having a MM core doped with one or more rare earth ions, such as ytterbium, erbium, and/or thulium, and surrounded by at least one cladding. In some embodiments, the core has a double bottleneck-shaped cross-section, as discussed in more detail below in reference to FIG. 7, which functions to increase the threshold for optical nonlinear effects.

The pulse energy can be increased by coupling an optional acousto-optical or electro-optical modulator (EOM) 514 between the pre-amplifying 515*a* and booster 515*b* stages. As will be appreciated, the optional EOM 514 can function as a pulse picker.

In accordance with one or more embodiments, the laser source 510 comprises an ultrafast seed laser, a pulse stretcher based on a CFBG, a pulse shaper, a fiber preamplifier, an optional pulse picker, a fiber amplifier, and a pulse compressor based on a volume Bragg grating (VBG).

Figure 6:
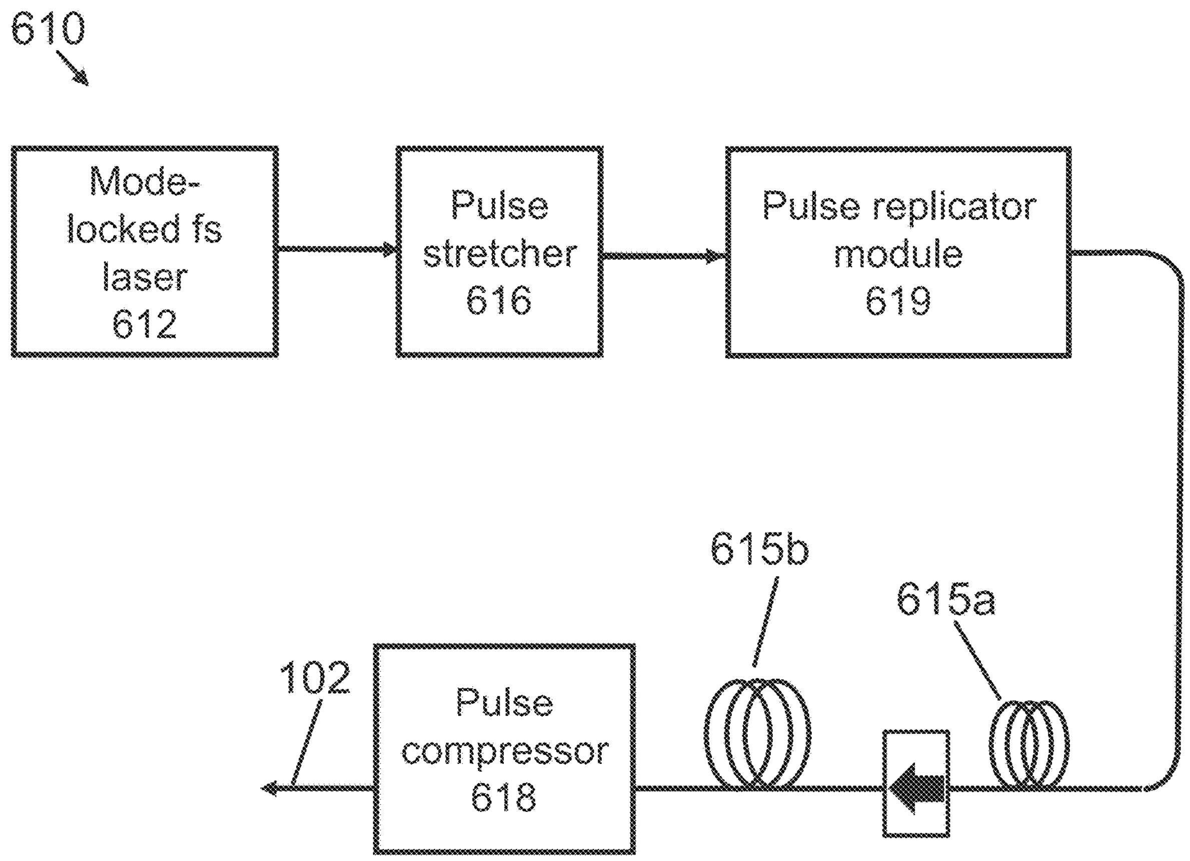
FIG. 6 PRIOR ART
FIG. 6 is a block diagram of another example of a laser source in accordance with at least one aspect of the invention.

Another non-limiting example of a CPA configuration in a laser system is shown in FIG. 6, generally indicated 610, which is also described in PCT patent application no. PCT/US20/16121, commonly owned by applicant, the content of which is fully incorporated herein by reference, and referred to herein as the '121 application. As shown in FIG. 6, laser source 610 includes a mode-locked fs laser 612, and a chirped pulse amplifier that includes a pulse stretcher 616 and a pulse compressor 618, which function in a similar manner as described above in reference to the laser system 510 of FIG. 5. However, prior to amplification, the stretched pulses are replicated using the pulse replicator module 619.

As explained in the '121 application, the pulse replicator module 619 is an all fiber device comprising input and output fiber optic couplers with fiber delays lines disposed therebetween, and is configured to increase the repetition rate of stretched laser pulses to generate modified pulses that have a desired peak-to-average power ratio. These modified laser pulses then complete the rest of the CPA process, in that they are amplified in an amplifier (615*a* and 615*b*), and after amplification, the pulses are compressed back down to pulse durations in the sub-nanosecond regime (e.g., less than 400 fs). This process increases the peak power for efficient frequency conversion in the NLO assembly. The stretched pulses are replicated using the pulse replicator module 619 to pulse durations and repetition rates that simulate a nearly continuous wave (CW) configuration. This reduces the peak power and alleviates the issues associated with optical nonlinearities such as self-phase modulation (SPM), simulated Raman scattering (SRS), and four-wave mixing (FWM).

Figure 7:
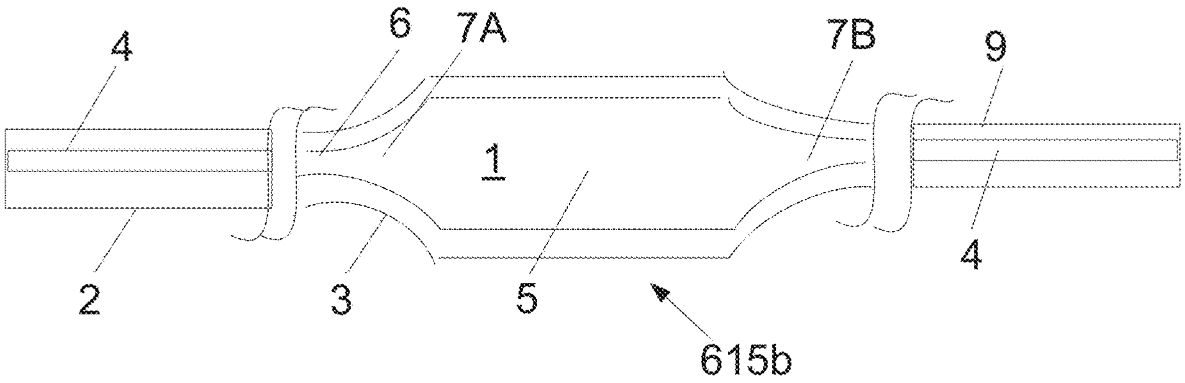
FIG. 7 PRIOR ART
FIG. 7 is a schematic representation of an active fiber used in an amplifier in accordance with aspects of the invention.

As mentioned above in reference to laser source 510, and as applies to some embodiments in reference to laser source 610, laser pulses of SM light are delivered via SM passive fiber to active fiber of amplifier 515*b* or 615*b* having a MM core doped with one or more rare earth ions, such as ytterbium, erbium, and/or thulium, and surrounded by at least one cladding. Referring to FIG. 7, fiber power amplifier 515*b* or 615*b* may be configured with a monolithic (one-piece) MM core 1 extending between the opposite ends of the amplifier that supports multiple transverse modes and is surrounded by at least one cladding 3. The core 1 is configured to support only a single, fundamental mode at the desired fundamental wavelength. This is realized by matching a mode field diameter (MFD) of MM core 1 to that of both a SM passive fiber 2 that guides modified laser light 148 along its core 4, and to an output passive SM fiber 9. When side-pumped, pump light from the pump is coupled to the central core region 5.

For purposes of further increasing the threshold for optical nonlinear effects, core 1 has a double bottleneck-shaped cross-section, as shown in FIG. 7. A uniformly-dimensioned input core end 6 can have a geometrical diameter equal to that of SM core 4 of passive fiber 2. When SM light at the fundamental wavelength is coupled into the input end 6 of the core, it excites only a fundamental mode whose intensity profile substantially matches a Gaussian intensity profile of the pure SM. The core 1 further includes a large diameter uniformly dimensioned mode transforming core part 5 that receives the guided fundamental mode through an adiabatically expanding mode transforming core region 7A. The large diameter of central core region 5 allows receiving greater amplifier pump powers without, however, increasing a power density within this part, which raises the threshold for optical nonlinear effects such as SPM, SRS, and FWM. The output mode transforming core region 7B may be configured identically to core region 7A to adiabatically reduce the mode field diameter of amplified pump light at the fundamental frequency. The amplified SM light is then coupled into the output SM passive fiber 9.

The mode-locked fs laser 612 (also referred to herein as a master oscillator as in reference to 512 of laser source 510 of FIG. 5, or as an ultrafast seed laser or a pulse generator or simply as a mode-locked laser source), can also include passively mode-locked fiber laser sources. In one embodiment, the mode-locked fs laser 512 or 612 is configured as a passively mode-locked fiber ring cavity. Such passive mode-locking configurations rely on the presence in the ring cavity of at least one component that has a nonlinear response to increasing peak intensity.

According to at least one embodiment, the mode-locked laser source 512, 612 is configured as a passively mode-locked fiber ring cavity configured to generate sub-nanosecond giant chirped pulses. The ring fiber waveguide or cavity includes multiple fiber amplifiers, chirping fiber components, and spectral filters configured with spectral band passes that are centered around different central wavelengths so as to provide leakage of light along the ring cavity in response to nonlinear processes induced in the ring cavity. The filters work in combination with one another to produce a nonlinear response, which enables a stable mode-locked mode of operation. One example of such a configuration is described in co-owned U.S. application Ser. No. 15/536,170, now U.S. Pat. No. 10,193,296, which is incorporated herein by reference and referred to herein as the '170 application.

Figure 8:
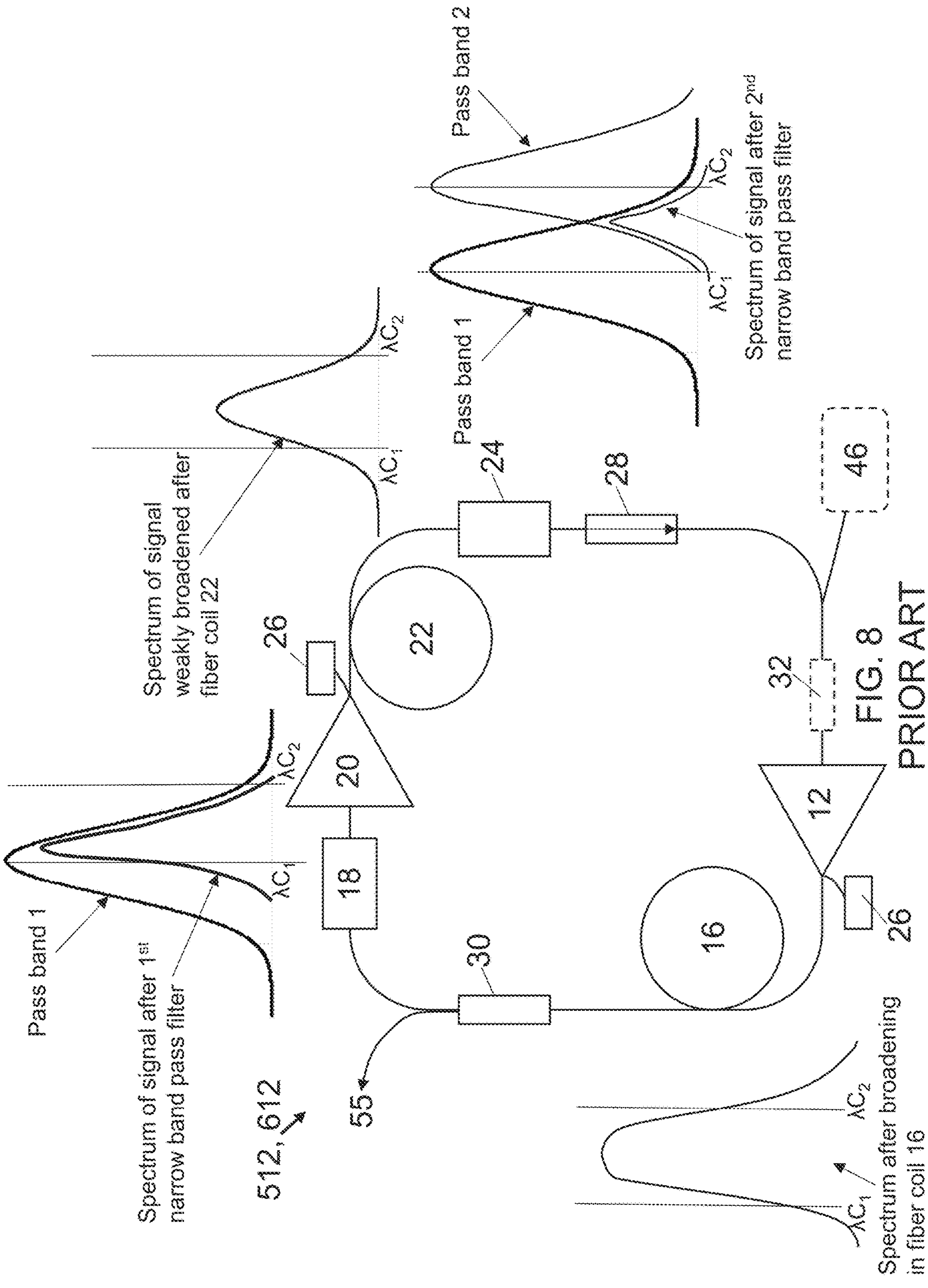
FIG. 8 PRIOR ART
FIG. 8 is a schematic representation of one example of a passively mode-locked fiber laser source in accordance with aspects of the invention.

FIG. 8 is a schematic representation of the pulse generator described in the '170 application and is an example of a mode-locked fs laser source 512, 612 suitable for one or more embodiments of the invention. The all-fiber architecture lends the laser source environmental stability and is configured as a ring fiber waveguide or cavity guiding light in one direction. A fiber isolator 28 provides the desired directionality of light propagation within the ring fiber waveguide. The ring cavity is configured such that the output of one of first fiber amplifier 12 and second fiber amplifier 20 seeds the other fiber amplifier. Between the first and second amplifiers 12 and 20 two or more identical groups or chains of fiber elements are coupled together to define the ring cavity. Besides the fiber amplifier, each chain includes a fiber coil 16, 22 which provides respective periodic spectral and temporal broadening of the signal, and narrow line filters 18, 24 that are operative to spectrally filter the broadened signal. The whole ring laser cavity thus includes two cavities, linear sub-cavities, providing very weak seed one to another. The whole ring laser cavity has no longitudinal modes because of strong attenuation of the signal within the range of transmittance of both filters, which is needed for discrimination against spontaneous CW lasing.

The overall architecture is described here in general terms. One of the fiber amplifiers 12, 20 is configured to provide much higher gain than the other amplifier. The higher pumped amplifier creates conditions for strong pulse broadening due to SPM, making the pulse positively chirped and having a broad and smooth spectrum. This spectrum fills completely the pass band of the filter located downstream from it, so that its replica evolves in the cavity afterwards. The other, lower pumped amplifier ensures stable performance, i.e., to lock the laser in a stable equilibrium state when small deviations from this state create an action returning it to the target state. The spectrum reaching the filter downstream from the lower pumped amplifier does not fill the pass band of this filter completely, which creates the force returning the laser to the target state when a deviation happens. In order for the laser pulse to circulate and evolve within the ring cavity, its intensity must be sufficient for the pulse to experience nonlinear spectral broadening and recover intensity after each pass along the cavity. The combination of the two filters 18, 24 having weak spectral overlap works as an effective saturable absorber. Weak spectral overlap allows discrimination against CW in favor of a pulse having sufficient intensity for spectral broadening. When the peak intensity reaches the level sufficient to broaden the pulse spectrally, the losses for the newly acquired spectral components drop as these components are spreading toward the center of the filter pass band. It is to be appreciated that stable and reproducible circulation of the pulse along the cavity may occur without any spectral overlap of the filters 18, 24, but overlap can allow for ease in starting the laser pulsing.

The filters 18 and 24 are each configured to pass only a desired spectral range and, if needed, introduce either a normal or anomalous dispersion. One of the filters may be configured with a bandpass that is at most five (5) times broader than the bandpass of the other filter. Furthermore, the bandpass of each of the filters can be from 2 to 10 times narrower than that of output pulse 55. However, in some cases, the desired pulse width can be narrower than the bandpass of the filters. The sequence of spectral broadening and filtering generates pulses with a giant chirp having a desired spectral width, pulse duration, and energy.

The ring waveguide further includes an output coupler 30 positioned immediately downstream from fiber coil 16 that guides the chirped pulse 55 outside the ring waveguide. To create the desired population inversion in a gain medium of the amplifiers, i.e., to start the operation of the pulse generator, one or two CW pumps 26 are optically coupled to the respective amplifiers. All of the above-discussed components are interconnected by single transverse mode (SM) fibers. Both laser sources 510 and 610 are all-fiber configurations.

EXPERIMENTS

Functions and advantages of the embodiments of the systems and methods disclosed herein may be more fully understood based on the experiments described below. The experiments are intended to illustrate various aspects of the disclosed DUV laser system.

Experiment 1—Time Delays Incurred in NLO Crystals

FIG. 9 is a table showing the experimental parameters and results from an experiment conducted to examine time delays incurred in Type I and Type II SHG and THG NLO crystals. The SHG and THG nonlinear crystals were made from LBO material. The results indicated that the time delay between harmonic pulses in the SHG changes with changing beam intensity and is therefore intensity dependent. The table of FIG. 9 is an indicator of how much time delay can be compensated for within a temperature range of 35°-190° C. The inventors found that larger compensations could be achieved with higher oven temperatures for the TDC plate. For instance, with oven temperatures of up to 500° C., a larger range of time delays could be achieved. In addition, with increasing intensity, more time delay range was needed from the crystals and/or a second TDC plate with a different thickness.

Experiment 2—Time Delay Compensation in LBO Cut Along Z vs. Y Axis

Experiments were conducted to examine time delay compensation in LBO material cut along the z-axis ($TDC_{0/0}$) versus the y-axis ($TDC_{90/90}$), with the experimental parameters and results shown in FIG. 10*a* (z-axis results) and 10*b* (y-axis results). Results from these experiments indicated that LBO cut along the z-axis exhibited the highest TDC dynamic range due to lower hot spot formation and absorption. LBO cut along the y-axis exhibited a much lower TDC dynamic range than the LBO cut along the z-axis, but also had higher absolute TD values over the z-axis cut LBO, and had the lowest hot spot formation and absorption.

The DUV laser system described herein has many potential uses. The range of output wavelengths and power are such that microbial and viral pathogens are destroyed, but do not harm humans since the penetration depth is so small (i.e., less than one micron). This means that the system can be run continuously in indoor environments populated by people, such as schools, airplanes and other modes of transport (e.g., subways, trains, buses, etc.), shops and malls, convention centers, restaurants, etc. The output power and power density can also be adjusted for a specific environment and/or application. The coherent laser light source allows for a precise (and instantaneous) application of light energy and volume over the space to be disinfected. This precision is not obtainable using conventional lamps. In accordance with at least one embodiment, the systems and methods disclosed herein can comprise irradiating at least one of a microbial or viral pathogen with the fifth harmonic laser beam.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A deep ultraviolet (DUV) laser system, comprising:

a laser source configured to emit a laser beam at a fundamental wavelength in the near-infrared, the fundamental laser beam configured as a plurality of pulses having a pulse duration of less than 400 femtoseconds (fs);

a nonlinear crystal assembly comprising first, second, and third nonlinear crystals and configured to convert the fundamental laser beam to produce a fifth harmonic laser beam having a wavelength in a range from 200 nanometers (nm) to 230 nm;

at least one compensation plate disposed in at least one position preceding at least one of the first, second, and third nonlinear crystals and configured such that a pair of pulsed laser beams transmitted through the at least one compensation plate are spatially and temporally overlapped within the at least one of the first, second, and third nonlinear crystals;

at least one oven, each oven configured to adjust a temperature in a range from 10° C. to 500° C. of the at least one compensation plate to compensate a temporal delay between the pair of pulsed laser beam; and a controller configured to control the temperature based on an intensity value of the laser beam emitted from the laser source.

2. The DUV laser system of claim 1, wherein the first nonlinear crystal receives the fundamental laser beam and is configured to convert the fundamental laser beam to emit a second harmonic laser beam and the fundamental laser beam, the second nonlinear crystal receives the fundamental laser beam and the second harmonic laser beam and is configured to perform sum-frequency mixing of the fundamental laser beam and the second harmonic laser beam to produce a third harmonic laser beam and the second harmonic laser beam, and the third nonlinear crystal receives the second harmonic laser beam and the third harmonic laser beam and is configured to perform sum-frequency mixing of the second and third harmonic beams to produce the fifth harmonic laser beam.

3. The DUV laser system of claim 2, wherein the at least one compensation plate is made of LBO and comprises a first compensation plate disposed upstream from the first nonlinear crystal or between the first and second nonlinear crystals, and a second compensation plate disposed between the second and third nonlinear crystals.

4. The DUV laser system of claim 3, wherein the second nonlinear crystal is a type I crystal of LBO or a type II crystal of LBO.

5. The DUV laser system of claim 3, further comprising a half-wave plate positioned upstream from the first compensation plate, or between the first compensation plate and the second nonlinear crystal, or between the second compensation plate and the third nonlinear crystal.

6. The DUV laser system of claim 2, wherein the first, second, and third nonlinear crystals comprise LBO, LBO, and BBO respectively.

7. The DUV laser system of claim 2, further comprising at least one telescopic lens positioned upstream from the first nonlinear crystal, wherein the at least one telescopic lens is configured such that a light beam incident on the at least one telescopic lens enters the at least one telescopic lens as a light beam of a first diameter and exits the at least one telescopic lens as a light beam of a second diameter.

8. The DUV laser system of claim 1, wherein the first nonlinear crystal is configured to receive the fundamental laser beam and convert the fundamental laser beam to emit a second harmonic laser beam and the fundamental laser beam, the second nonlinear crystal is configured to convert the second harmonic laser beam to produce a fourth harmonic laser beam, and the third nonlinear crystal is configured to receive the fundamental laser beam and the fourth harmonic laser beam and perform sum-frequency mixing of the fundamental laser beam and the fourth harmonic laser beam to produce the fifth harmonic laser beam.

9. The DUV laser system of claim 1, further comprising at least one oven for adjusting a temperature of a nonlinear crystal of the nonlinear crystal assembly such that the nonlinear crystal is at an optimum temperature where nonlinear multi-photon absorption by a crystal material of the at least one nonlinear crystal is minimized.

10. The DUV laser system of claim 1, wherein the $5^{th}$ harmonic laser beam has a wavelength of about 206 nm.

11. The DUV laser system of claim 1, wherein the fifth harmonic laser beam has an average output power of at least 1 watt (W).

12. The DUV laser system of claim 1, wherein the laser source comprises a mode-locked fiber laser and a chirped pulse amplifier comprising a pulse stretcher and a pulse compressor configured for chirped pulse amplification.

13. A method for generating deep ultraviolet (DUV) laser light, comprising:

generating in a laser source a laser beam at a fundamental wavelength in the near-infrared and having a pulse duration of less than 400 femtoseconds (fs);

directing the fundamental laser beam through a nonlinear crystal assembly comprising first, second, and third nonlinear crystals and configured to convert the fundamental laser beam into a fifth harmonic laser beam having a wavelength in a range from 200 nanometers (nm) to 230 nm;

disposing at least one compensation plate in at least one position preceding at least one of the first, second, and third nonlinear crystals, the at least one compensation plate configured such that a pair of pulsed laser beams transmitted through the at least one compensation plate are spatially and temporally overlapped within the at least one of the first, second, and third nonlinear crystals;

positioning the at least one compensation plate in an oven, the oven configured to adjust a temperature of the at least one compensation plate; and controlling the oven to heat to a temperature in a range from 10° C. to 500° C. such that the at least one compensation plate compensates for a temporal delay between the pair of pulsed laser beams.

14. The method of claim 13, further comprising disposing a half-wave plate in a position preceding at least one of the first, second, and third crystals of the nonlinear crystal assembly; and disposing a pair of telescopic lenses in a position preceding the first nonlinear crystal.

15. The method of claim 13, wherein the fifth harmonic laser beam has a wavelength of 206 nm and an average output power of at least 1 watt (W).

16. The method of claim 13, further comprising providing the at least one compensation plate, the at least one compensation plate made from LBO.

17. The method of claim 13, further comprising providing the laser source, wherein the laser source comprises a mode-locked fiber laser and a chirped pulse amplifier comprising a pulse stretcher and a pulse compressor configured for chirped pulse amplification.

18. The method of claim 13, further comprising positioning at least one of the first, second, and third nonlinear crystals in an oven configured to adjust a temperature of the at least one nonlinear crystal, and controlling the oven such that the temperature of the at least one nonlinear crystal is at an optimum temperature where nonlinear multi-photon absorption by a crystal material of the at least one nonlinear crystal is minimized.

19. The method of claim 13, further comprising irradiating at least one of a microbial or viral pathogen with the fifth harmonic laser beam.

* * * * *